US008725812B2

(12) United States Patent  (10) Patent No.: US 8,725,812 B2
Ahn et al.  (45) Date of Patent: May 13, 2014

(54) METHOD FOR PROVIDING A MEMO FUNCTION IN ELECTRONIC MAIL SERVICE

(75) Inventors: Jung-Eun Ahn, Gyeonggi-do (KR); Kang-Youl Kim, Gyeonggi-do (KR)

(73) Assignee: NHN Corporation, Gyeonggi-Do (KR)

( * ) Notice: Subject to any disclaimer, the term of this patent is extended or adjusted under 35 U.S.C. 154(b) by 1001 days.

(21) Appl. No.: 11/572,740

(22) PCT Filed: Jul. 27, 2005

(86) PCT No.: PCT/KR2005/002444
§ 371 (c)(1),
(2), (4) Date: Jan. 26, 2007

(87) PCT Pub. No.: WO2006/011755
PCT Pub. Date: Feb. 2, 2006

(65) Prior Publication Data
US 2007/0239836 A1  Oct. 11, 2007

(30) Foreign Application Priority Data
Jul. 30, 2004  (KR) .................. 10-2004-0060452

(51) Int. Cl.
*G06F 15/16*  (2006.01)
(52) U.S. Cl.
USPC .......................... 709/206; 709/207; 715/772
(58) Field of Classification Search
USPC ...................................... 709/206
See application file for complete search history.

(56) References Cited

U.S. PATENT DOCUMENTS

| 5,948,058 | A  | * | 9/1999  | Kudoh et al. ............... 709/206 |
| 6,247,045 | B1 | * | 6/2001  | Shaw et al. ................. 709/207 |
| 6,707,472 | B1 | * | 3/2004  | Grauman .................... 715/752 |
| 6,895,426 | B1 | * | 5/2005  | Cortright et al. ............ 709/206 |
| 7,054,906 | B2 | * | 5/2006  | Levosky ..................... 709/206 |
| 7,082,458 | B1 | * | 7/2006  | Guadagno et al. .......... 709/204 |
| 2001/0054084 | A1 | * | 12/2001 | Kosmynin ................... 709/218 |
| 2002/0019825 | A1 | * | 2/2002  | Smiga et al. ................ 707/102 |
| 2002/0029269 | A1 | * | 3/2002  | McCarty et al. ............ 709/225 |
| 2002/0112010 | A1 |   | 8/2002  | Soroker et al. |
| 2002/0178229 | A1 | * | 11/2002 | Sinha et al. ................. 709/206 |
| 2003/0001889 | A1 | * | 1/2003  | Darby ......................... 345/752 |
| 2003/0016658 | A1 | * | 1/2003  | Creamer et al. ............ 370/352 |
| 2003/0135558 | A1 | * | 7/2003  | Bellotti et al. .............. 709/206 |
| 2003/0135565 | A1 | * | 7/2003  | Estrada ....................... 709/206 |
| 2003/0154254 | A1 | * | 8/2003  | Awasthi ...................... 709/206 |

(Continued)

FOREIGN PATENT DOCUMENTS

EP  1058199  12/2000
JP  1997-198328 A  7/1997
KR  1999-83930 A  12/1999

*Primary Examiner* — Hamza Algibhah
(74) *Attorney, Agent, or Firm* — Harness, Dickey & Pierce, P.L.C.

(57) ABSTRACT

Disclosed is a method and system for providing memo in electronic mail. Memo data is further added to general mail data. Electronic mail sender sends electronic mail including memo data. The memo data may be inserted in the mime header or may be inserted in the form of attachment file, or may be inserted in the mail body. Besides that mail sender inserts memo data, mail receiver can also insert memo data to received mail for mail management. Users can check identify mail more conveniently through memo related to mail. A memo icon is provided in mail read page, and memo is displayed to users when mouse event on the memo icon occurs.

20 Claims, 6 Drawing Sheets

(56) References Cited

U.S. PATENT DOCUMENTS

| | | | |
|---|---|---|---|
| 2003/0167310 A1* | 9/2003 | Moody et al. | 709/206 |
| 2003/0229667 A1* | 12/2003 | Pedersen et al. | 709/206 |
| 2003/0229672 A1* | 12/2003 | Kohn | 709/207 |
| 2003/0233419 A1* | 12/2003 | Beringer | 709/206 |
| 2004/0103155 A1* | 5/2004 | Perepa et al. | 709/206 |
| 2004/0128353 A1* | 7/2004 | Goodman et al. | 709/204 |
| 2004/0172456 A1* | 9/2004 | Green et al. | 709/207 |
| 2004/0212639 A1* | 10/2004 | Smoot et al. | 345/752 |
| 2004/0236749 A1* | 11/2004 | Cortright et al. | 707/9 |
| 2005/0091355 A1* | 4/2005 | Keohane et al. | 709/223 |
| 2005/0108338 A1* | 5/2005 | Simske et al. | 709/206 |
| 2005/0204005 A1* | 9/2005 | Purcell et al. | 709/206 |
| 2005/0234843 A1* | 10/2005 | Beckius et al. | 707/1 |
| 2006/0242243 A1* | 10/2006 | Matsumoto | 709/206 |
| 2008/0005247 A9* | 1/2008 | Khoo | 709/206 |
| 2011/0131290 A1* | 6/2011 | Kim et al. | 709/217 |

* cited by examiner

METHOD FOR PROVIDING A MEMO FUNCTION IN ELECTRONIC MAIL SERVICE

CROSS REFERENCE TO RELATED APPLICATIONS

This application is a U.S. National Phase Application of International Application PCT Application No. PCT/KR2005/002444 filed on Jul. 27, 2005, which claims the benefit of priority from Korean Patent Application No. 10-2004-0060452 filed on Jul. 30, 2004. The disclosures of International Application PCT Application No. PCT/KR2005/002444 and Korean Patent Application No. 10-2004-0060452 are incorporated herein by reference.

FIELD OF THE INVENTION

The present invention relates to an electronic mail, more particularly to a web mail service method and computer-readable medium by which users can manage electronic mails more effectively

BACKGROUND OF THE INVENTION

Unlike general mail system, mail is read in web browser without particular interface or protocol for receiving mail from mail server in web mail system. In initial state of web mail, small size storage space, for example 5 megabytes (MB) was given in web mail service. However, recently large size storage space up to 1 gigabyte (GB) is being provided. Data having similar size with text data was transmitted as attachment file in the past, however, recently moving picture file or MP3 file more than tens of MB can be transmitted through web mail. Therefore, the uses of web mail are being changed. That is, web mail was mainly used for text sending in the past. However, large size web mail service enabled mail service to be used in file storage and management of document.

Recently, various mails such as good order verification mail, delivery verification mail are transmitted as electronic commerce through internet increases. However, most of mails related to the electronic commerce were sent by automatic mail sending system, and therefore same mail title was given for each of category. Therefore, users should open the mail if the users want to check goods related to the mail. Besides the electronic commerce, many users use email for management of file and document. However, users cannot know to which file or document a mail is related, unless users open the mail.

In prior art, preview function is provided for users to check mail contents without opening mail in web mail service as well as mail browser program such as OUTLOOK EXPRESS®. However, in order to perform preview, the web mail system should transmit mail contents along with title of each mail to the subscriber terminal, by which load of mail server definitely increases. Load of mail server occurs in local mail server as well as the web mail server.

DETAILED DESCRIPTION OF THE INVENTION

Technical Objects

The present invention provides a method enabling users to check mail contents briefly without opening mail by inserting memo explaining mail briefly.

Further, the present invention provides a method enabling a mail sender as well as a mail receiver to insert memo, by which users can check mail contents briefly without causing load of mail server.

Moreover, the present invention provides a method for checking mail contents briefly through memo, by which users can use large size mail space effectively.

Technical Solution

According to the preferred embodiment of the present invention, there is provided a method and computer-readable medium being performed in a mail server for providing memo function in electronic mail, comprising the steps of: checking if memo data inputted by a mail sender is included in a new received electronic mail; deriving the included memo data from the electronic mail to insert the memo data to electronic mail header; deriving predetermined number of electronic mail headers stored in a receiver mail box in response to mail read request from a receiver mail user agent (MUA); generating a mail read page, the mail read page displaying predetermined number of electronic mail header having memo data, and including applet which outputs memo data when mouse event is detected in the receiver MUA; and transmitting the mail read page to the receiver MUA.

According to another aspect of the present invention, there is provided a method and computer-readable medium for providing memo function in electronic mail, comprising the steps of: checking if memo data inputted by a mail sender is included in a new received electronic mail; deriving the included memo data from the electronic mail to store the memo data in a memo database and storing storage location of the memo data in a mail box by associating the storage location information with the received mail; deriving predetermined number of electronic mail headers stored in the receiver mail box in response to mail read request from a receiver MUA; generating a mail read page, the mail read page displaying predetermined number of electronic mail headers in the form of list, displaying memo icon for the electronic mail header with memo data, and including applet which outputs memo data when mouse event is detected in the receiver MUA; and transmitting the mail read page to the receiver MUA.

According to still another aspect of the present invention, there is provided a method and computer-readable medium being performed in a mail server for providing memo function in electronic mail, comprising the steps of: deriving predetermined number of electronic mail headers in response to mail read request from a receiver MUA; generating a mail read page that displays data corresponding to at lest one field of the predetermined number of mail headers in the form of list to transmit the mail read page to the receiver MUA; generating a mail contents read page with a memo input button that displays mail contents when one electronic mail in the list is selected to transmit the mail contents read page to the receiver MUA; and inserting memo data to the selected electronic mail header when the memo data is received from the receiver MUA.

MODE OF INVENTION

Hereinafter, the preferred embodiment of the present invention will be described with accompanying drawings.

Figure 1:
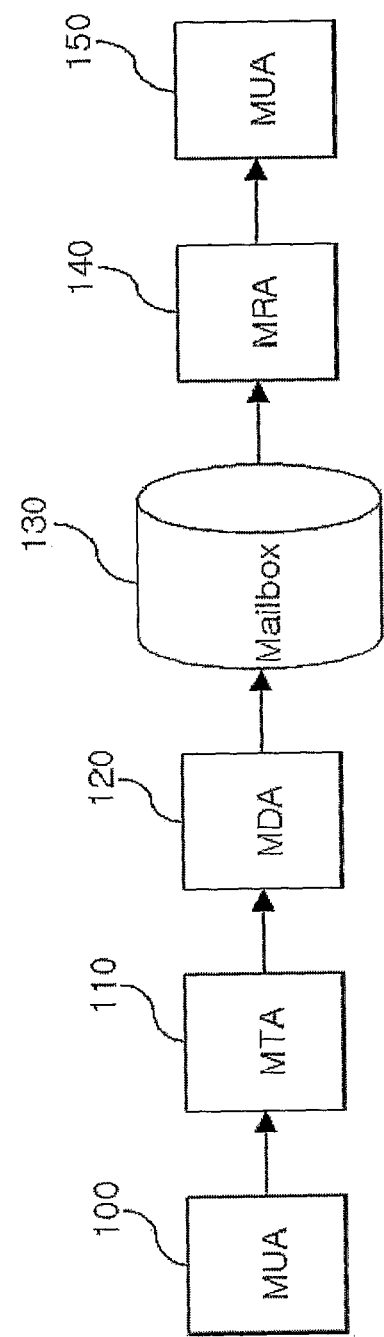
FIG. 1 illustrates a basic structure of a mail system where the present invention is applied.

FIG. 1 illustrates a basic structure of a mail system where the present invention is applied.

MUA (Mail User Agent) 100, 150 is a client program used in sending and receiving electronic mails. In case of web mail that provides mail from a remote mail system through Post Office Protocol (POP), Internet Message Access Protocol (IMAP), etc., Internet web browser is generally used as the MUA. Mail browser programs such as OUTLOOK EXPRESS® of MICROSOFT®, or Netscape Mail of Netscape® can be also included in the MUA.

MTA (Mail Transfer Agent) 110 receives electronic mails through SMTP (Simple Mail Transfer Protocol). That is, MTA 110 sends electronic mails received from MUA or another MTA to other MTAs or delivers the received mail to a mail box 130 of user by calling MDA (Mail delivery Agent) 120.

MDA 120 delivers electronic mails that the MTA received to users. MDA delivers electronic mails internally or externally. There are a plurality of MDAs in each channel in delivering mail externally. In delivering mail internally, received mails are stored in a mail box of each user.

The mail box 130 is a database for storing electronic mails, there are MBOX method that attaches mails to in one file and a method that stores each of electronic mails as an independent file in one directory. Nowadays, MBOX method is most widely used.

MRA (Mail Retrieval Agent) 140 is a program for accessing electronic mails for seeing electronic mails externally, POP3 daemon and IMAP4 daemon are included in the MRA 140.

1. Attaching Memo to Electronic Mails

According to the present invention, memo data by which user can check mails briefly can be transmitted to the receiver by sender's inserting memo to the mail. Alternatively, memo data can be attached to the mail data by receiver's inserting memo to the received mail after receiving mail. Hereinafter, the method that a mail sender inserts memo data to the mail to be sent is described.

According to the embodiment of the present invention, the method for inserting memo may be classified into inserting memo to MIME header, inserting memo in the form of attachment file, and inserting memo into mail body data.

The First Embodiment

Figure 2:
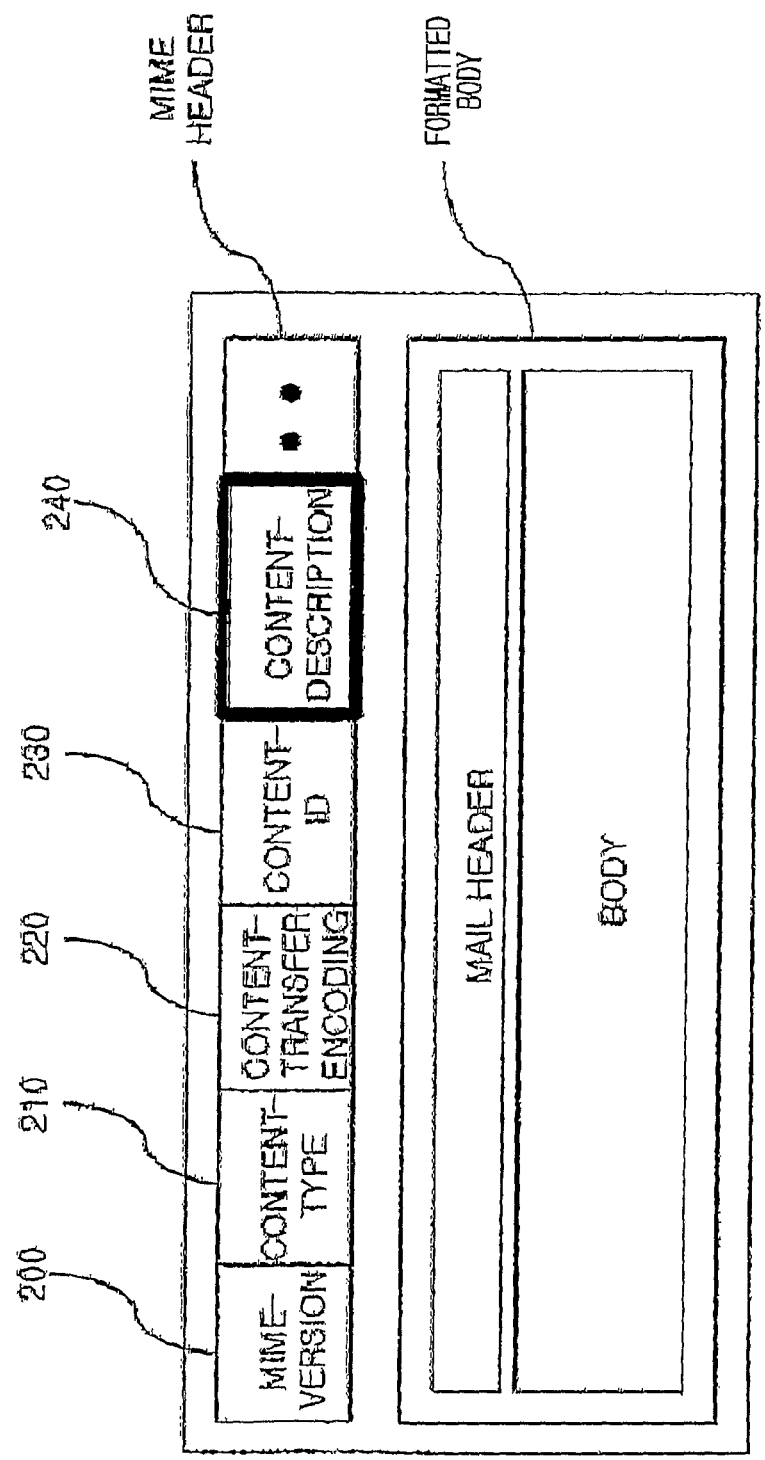
FIG. 2 illustrates an example for inserting memo using mail header information, particularly with multipurpose Internet mail extensions (MIME) header, in electronic mail encoded in MIME.

FIG. 2 illustrates an example for inserting memo using mail header information, particularly with MIME header, in electronic mail encoded in MIME.

Referring to FIG. 2, the mail comprises header information and body information, the MIME header comprises a plurality of fields, and most of the fields include information regarding mail body encoded in MIME. According to the first embodiment, memo data written by a mail sender is inserted to mail header information. The first embodiment is advantageous in compatibility between systems because standard is maintained. Most of the recent electronic mails are not written in text but written in Rich Text Format (RTF) or HyperText Markup Language (HTML). Therefore, MIME encoding is indispensable in electronic mail transmission.

Version information of MIME is written in MIME version field 200.

Data format in message is written in the Content-Type field 210 in order for MUA to perform parsing for mail body contents correctly.

Information on message encoding method is written in the Content-Transfer-Encoding field 220.

Reference information for body is written in Content-ID field 230.

Information for explaining body is written in the Content-Description field 240, and this field can be used selectively. The Content-Description field 240 is generally used when text-explanation is added for attached binary file. However, most of MUA does not display Contents-Description field 240 directly, and information in Contents-Description field is rarely used nowadays since multiple partial mail message has been possible.

Therefore, in the first embodiment, memo data written by a mail sender is inserted in the Content-Description field 240. An interface for inserting memo is provided to the sender MUA, and the memo written by the mail sender is inserted in the Content-Description field 240 to be transmitted to a receiver mail system. The receiver mail system derives memo information from the Content-Description field 240 to display, by which memo can be sent/received easily without changing mail standard.

According to the preferred embodiment, although the memo data is inserted to the Content-Description field 240, it would be obvious to those skilled in the art that the memo data can also be inserted to other fields besides the Content-Description field 240. Further, memo data can be also inserted to a new field added for memo insertion. In inserting memo in the new added field, a new header of which the name is stated as 'X-may be added in the field to insert memo.

The Second Embodiment

Figure 3:
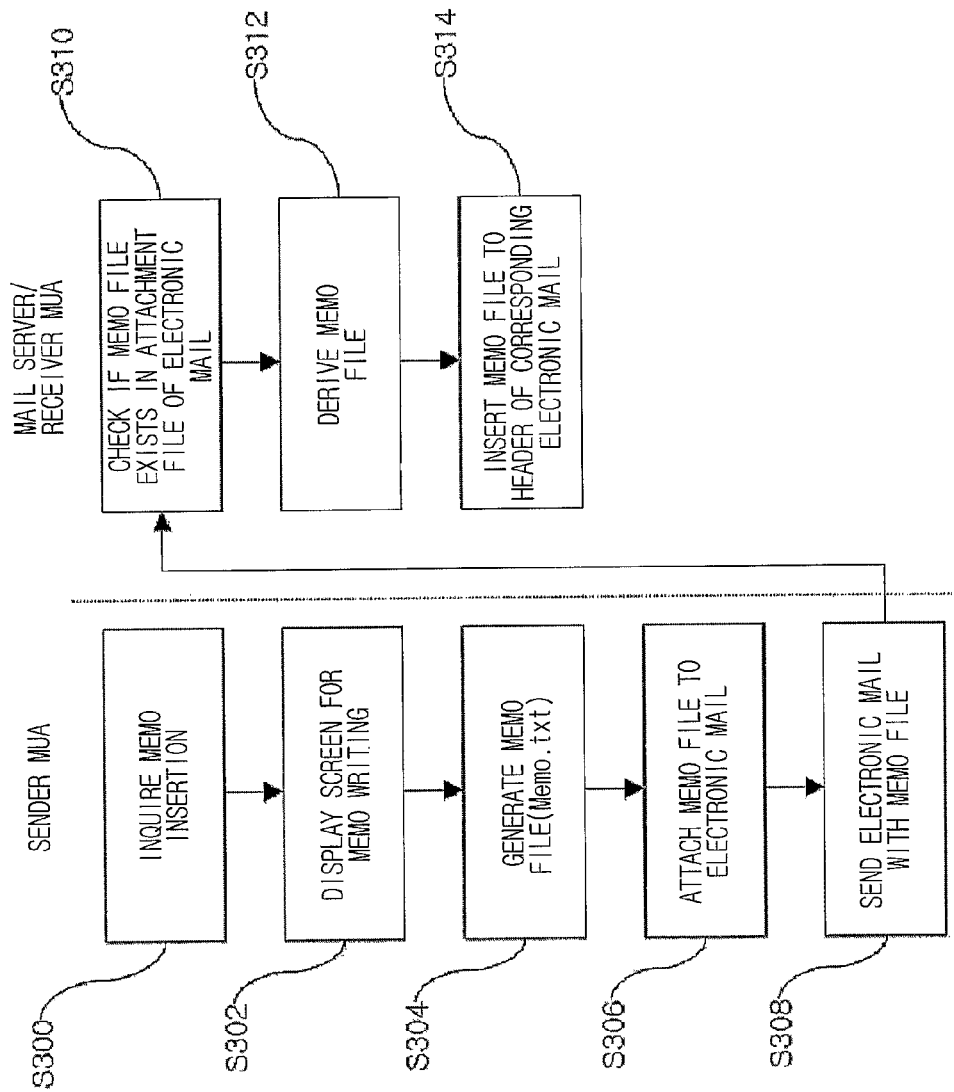
FIG. 3 is a flow chart for inserting memo data in the form of attachment file to transmit the memo data.

FIG. 3 is a flow chart for inserting memo data in the form of attachment file to transmit the memo data. Referring to FIG. 3, memo can be inserted in the form of attachment file in the sender MUA. The sender MUA inquires to sender if the sender writes memo for explanation of the mail when the sender selects mail write button or mail send button S300. The sender MUA may inquire in various ways, for example, pop-up menu is displayed for selecting memo writing, and screen for writing memo is provided if the mail sender selects memo writing S302.

If the mail sender inputs memo data in the memo writing screen and selects complete button, the sender MUA generates file(for example, MEMO.TXT) including the inputted memo data S304. It would be obvious to those skilled in the art that file name and file format can be varied.

The generated memo file is attached to the electronic mail S306, and the electronic mail is sent to the mail server corresponding to the mail address of receiver S308.

The mail server or receiver MUA that received mail checks if attachment file exists, and further checks if memo file with predetermined name is attached when attachment file exists S310. It is preferable that MUA-mail server, MUA-MUA use unique identification information for the memo file in order to identify if the attached file is the memo file.

If memo file is attached, memo file is derived from the electronic mail S312. It is preferred to delete the memo file in the original electronic mail.

The derived memo file contents is inserted to the header information in the electronic mail stored in the mail box S314.

The memo inserted in the header of the electronic mail can be derived with data in other fields to be displayed in the receiver computer. The method for displaying memo will be explained later. Alternatively, memo file can be stored in the database for managing only memo information independently.

The Third Embodiment

Memo data can be inserted into body of electronic mail. Unique identifier for indicating memo (referred to as 'memo identifier' hereinafter) can be used for inserting memo into body of electronic mail that is written using HTML or languages with similar function with HTML. Although method for inserting memo is similar to that of FIG. 3, the third embodiment is different from the second embodiment in that memo data is inserted as a part of mail body message, not in the form of attachment file, and the mail server or receiver MUA checks if memo identifier exists in the mail message.

It is preferable that memo identifier format is adequate for type of electronic mail message. For example, as all command and indicating language includes < . . . > and </ . . . > pair in case of Extensible Markup Language (XML) document, the memo identifier also uses this type. For example, the memo data can be inserted to the mail body in the following method.

<brief-memo>
Ordered Samsung HDTV CR48 is under delivery.
</brief-memo>

The mail server or receiver MUA that received mail searches memo identifier in the electronic mail message and derives memo data corresponding to the memo identifier to insert it to mail header or store it in database which manages memo data independently.

The Forth Embodiment

As described above, the mail receiver can insert memo for management of mail after receiving mail besides that the mail sender can insert memo data on sending mail. The embodiment that the mail receiver inserts mail data for management of mail is described hereinafter.

Figure 4:
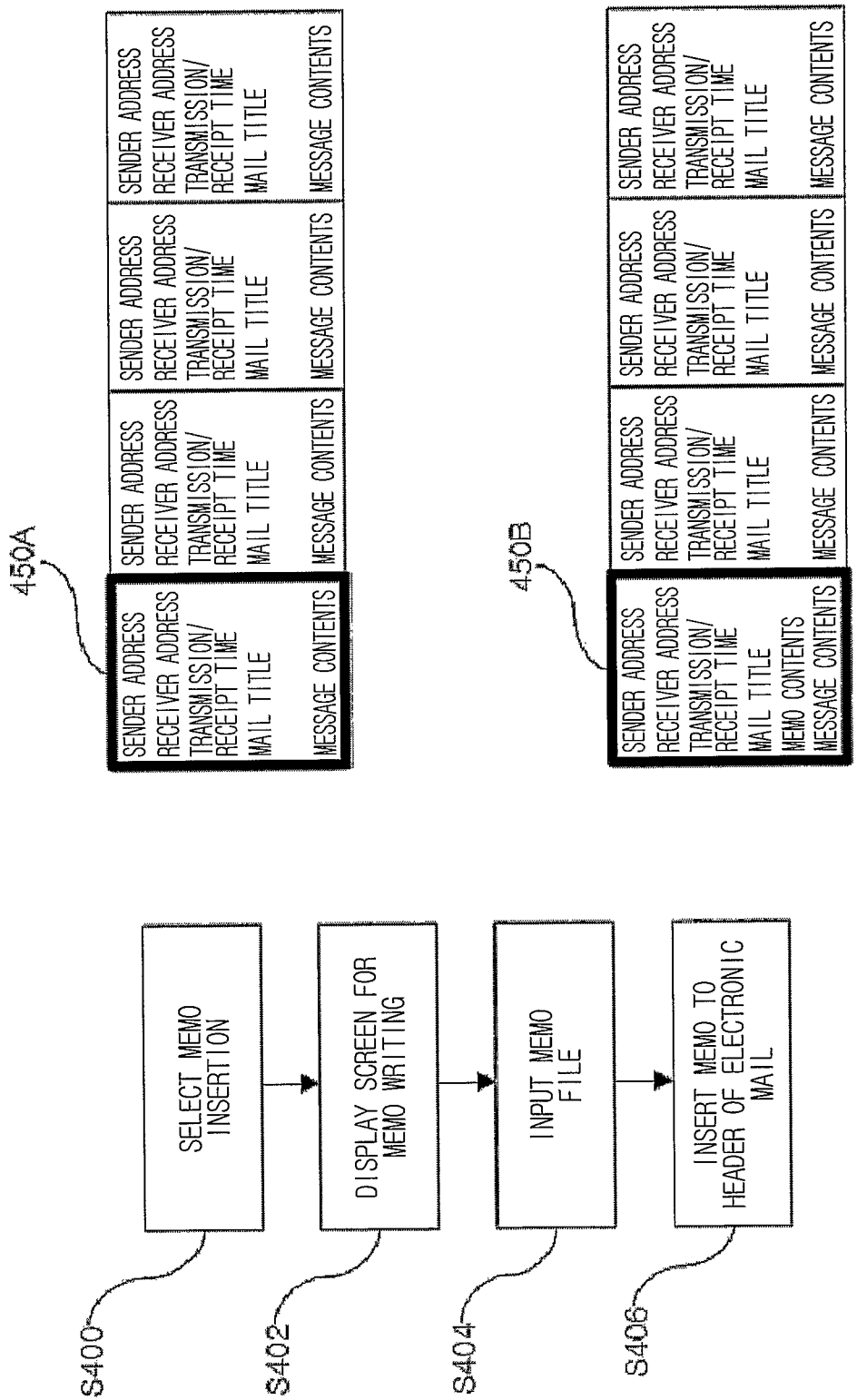
FIG. 4 illustrates a flow chart for inserting memo data in receiving mail according to a preferred embodiment of the present invention.

The mail receiver can write memo about subject matter of mail message or attachment file for management of mail after reading mail message. The header of electronic mail includes a sender address, a receiver address, a mail sending/receiving time and a mail title. The electronic mail includes header and body. As shown in FIG. 4, electronic mails are stored as one file in the mail box using MBOX method.

If receiver MUA derives a plurality of mail headers from mail box and displays, the receiver can select any electronic mail therefrom and the MUA displays contents of selected mail 450A by parsing. That is, the mail box transmits mail read page to the receiver MUA, and message contents derived from the mail box is displayed in a mail read page.

If the receiver selects memo input button for inserting memo for the selected mail S400, a screen for inputting memo data to be inserted to the electronic mail is displayed S402. That is, if the receiver selects the memo input button, the mail server transmits memo input page to the receiver MUA, and the receiver inputs memo data through the memo input page. When the receiver MUA is web browser, the memo input button may be located in upper part or lower part of the mail read page. When the receiver MUA is mail program, the memo input button may be located in upper part of the mail read window. Further, window for inputting memo can be located in the mail read page, and the receiver can input memo through the window.

If the receiver inputs brief information regarding mail through the memo input screen S404, the inputted memo data is transmitted to the mail server. If the same mail as the original mail stored in the mail server is stored in the receiver terminal, that is, user client, memo data may not be transmitted to the mail server.

The memo data inputted by the receiver is inserted to the header of electronic mail stored in the mail box 450B. If the mail stored in the mail box is encoded by MIME, the memo data may be inserted in the Content-Description field according to the first embodiment. Alternatively, independent database for only memo data (referred to as 'memo database' hereinafter) can be included in the mail system, and the memo database can store and manage the inputted memo data. The memo database communicates with the mail box, and the mail box can provide memo data when memo data of particular mail among a plurality of mails is requested through communication with the memo database.

II Method that Mail Server Handles Electronic Mail Including Memo Data

The method that the mail server or receiver MUA handles memo may be classified into two methods. One method is that the memo data is inserted to electronic mail header and managed as one electronic mail. The other method is that memo data is stored in the independent memo database and managed associated with the corresponding mail.

The mail server that received electronic mail where memo data is inserted checks if memo is inserted by above mentioned memo insertion ways, and inserts the inserted memo to electronic mail header. That is, when mail encoded by MIME is received, the mail server checks if memo is inserted by checking Content-Description field, and derives inserted memo to insert it to mail header of the decoded mail. If the mail is stored in MIME encoded state, the memo data can be inserted to the electronic mail header after MIME decoding and MIME encoding for the mail data is performed again.

If the memo data is transmitted in the form of attachment file, the mail server derives memo file from the electronic mail and inserts text contents included in the memo file to the electronic mail header. The memo file in original mail may be deleted.

When memo data is inserted into mail body of the received electronic mail, the mail server searches mail message in receiving electronic mail to determine if the memo identifier is included. If the memo identifier is included, memo data corresponding to the memo identifier is derived to be inserted to the electronic mail header. Memo data included in the message contents may be selectively deleted or maintained in the message.

When the memo data is stored and managed in the memo database, the electronic mail and the memo data are separately managed, the memo data base and the mail box communicates each other. The memo database includes at least electronic mail identification field and memo data field, which is preferably classified for each subscriber. The memo database can associate memo data with the corresponding electronic mail using identification information stored in the mail box (for example, subscriber identification information, unique code of the electronic mail, Primary Key information, sender mail address, receiver mail address, sending/receiving time, etc.). That is, the mail server stores memo data along with the identification information associated with the memo data in the memo database. Further, the memo database returns information on storage location where corresponding memo data is stored, the mail box inserts the storage location of the memo data to the electronic mail to be provided to user. The memo database may provide information on storage location of the memo data or memo data itself to the mail server in response to request of the mail server. This process will be explained in more detail later.

III Methods for Displaying Electronic Mails Including Memo

Figure 5:
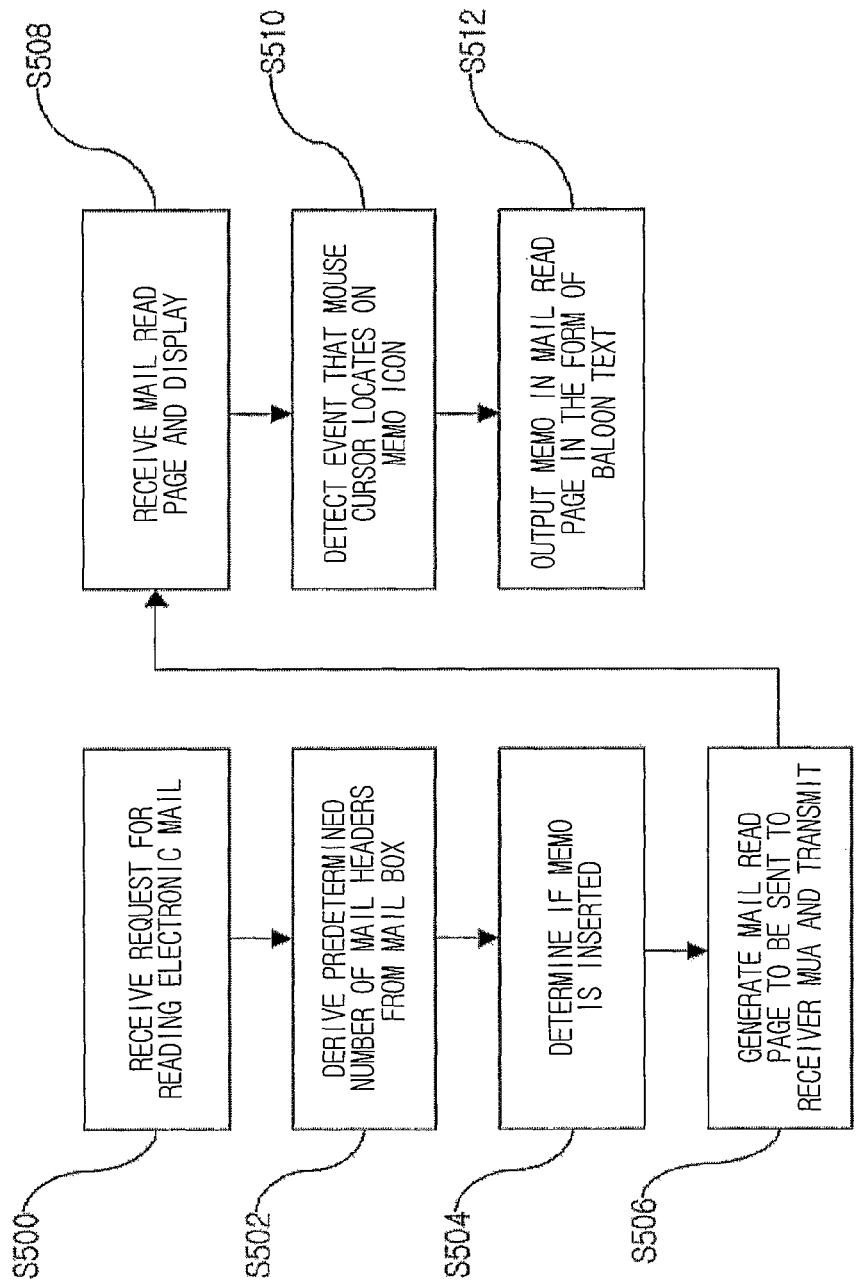
FIG. 5 illustrates a flow chart that mail server generates mail read page to be displayed in the receiver MUA for the mail where memo data is inserted.
Figure 6:
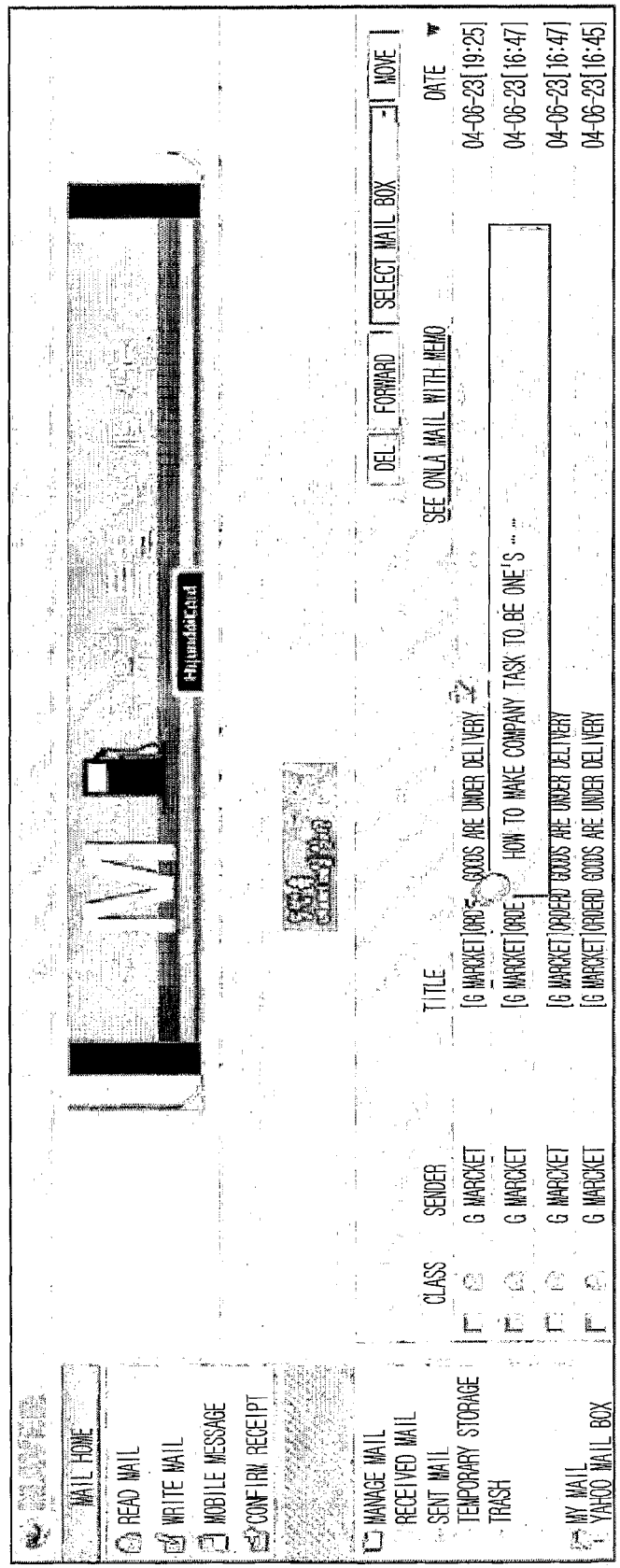
FIG. 6 illustrates an example screen by which users can check electronic mails including memo.

FIG. 5 illustrates a flow chart that mail server generates mail read page to be displayed in the receiver MUA for the mail where memo data is inserted, FIG. 6 illustrates an example screen by which users can check electronic mails including memo. The process that will be described hereinafter can be performed by not only the mail server but also the receiver MUA. For convenience of the explanation, example process performed by the mail server is described.

Through above described methods, the electronic mail of which the header includes memo is stored in the mail box for each receiver. If a receiver requests to read mail, the receiver MUA handles the request. After authenticating user through ID and password, the receiver accesses to the mail server through web browser or POP/IMAP daemon and requests mail reading S500. The mail server derives predetermined number of mail headers corresponding to output sequence from the mail box S502. If the receiver MUA is a web browser, the predetermined number is the number of mails provided in one mail read page, the output sequence may be determined by mail receipt time. In MBOX method, the file is updated whenever electronic mail is received, the predetermined number of mail headers may be derived from the front part or end part of the file.

Derived plurality of electronic mail headers are displayed in the form of list in the mail read page, for example, mail headers are displayed in the sequence of sender, mail title, mail send time. The mail read page is generated using template predetermined by web mail service provider, if the memo data is inserted in the electronic mail header S504, the memo data is inserted in the mail read page in hidden state, the memo icon is displayed in the mail read page for indicating if memo is included or not S506. Preferably, the memo icon is located in left side or right side of the mail tile to indicate memo insertion. The mail read page template does not output memo data directly. The mail read page templates includes memo output applet by which memo data is not outputted directly in receiver terminal, but outputted in the form of balloon text when mouse cursor locates on the memo icon or click event on the memo icon occurs.

According to another embodiment, if memo data is stored in the memo database, it is checked if memo data exists through communication between the mail server and the memo database in step S504. When checking existence of memo data through communication between the mail server and the memo database, the mail server inquires to memo database using identification information, and the memo database returns corresponding memo data to the mail server. The mail server expresses memo icon for the mail having memo data, and the memo data is inserted to the mail read page to be transmitted to the receiver MUA. According to another embodiment where mail box stores storage location of the memo data, only the memo data for the mails to be displayed in the mail read page can be derived from the memo database to be inserted to the mail read page. However, preferably, only the storage location of the memo data is included in the mail read page, and the receiver MUA downloads memo from the memo database using the storage location after the receiver MUA receives mail read page from the mail server. Download of memo data can be performed while downloading mail read page, or download of memo data can be also performed when mouse cursor event occurs.

According to another embodiment of the present invention, mail header information can be stored in the memo database along with the memo data. In order for the memo database to store the header information of the mail data stored in the mail box, the process that the mail server derives header information on receiving mail and stores it in the memo database should be performed previously. In this case, the mail server derives not only the memo data but also the header information to store it in the memo database when memo data is included in the mail data.

As described above, when the mail header information and the memo information are stored together in the database, the mail server can generate mail read page only with the stored information in the database, because only the header information such as sender, title, date is displayed in the mail read page.

Therefore, according to another embodiment, when a user requests mail read page, the mail server derives header information from the database (the mail server does not derive from the mail box), and the mail server also derives memo data together from the database to generate mail read page when memo data is included in certain mail. As described above, preferably, the mail read page template does not output memo data directly, and the mail read page templates includes memo output applet by which memo data is not outputted directly in receiver terminal, but outputted in the form of balloon text when mouse cursor locates on the memo icon or click event on the memo icon occurs.

The mail read page which provides list of mails can be generated by above, mentioned process, however, if the user requests mail body, the mail body data is derived from the mail box to be provided to the corresponding user. Above mentioned process is advantageous in that memo it is possible to provide memo data and mail header data while minimizing load of the mail box.

The receiver MUA displays mail read page generated by various ways which are mentioned above on screen S508. If the mail read page is outputted on the screen, the memo output applet detects movement of cursor or occurrence of click event.

When a user locates cursor on memo icon or clicks/double clicks the memo icon included in the mail read page, the memo output applet detects it S510, and balloon form memo text corresponding to the selected memo icon included in the mail read page is displayed. The memo data can be also outputted through independent output window besides balloon form. FIG. 6 illustrates an example that memo data is outputted in the form of balloon by movement of the curser. When only the storage location of the memo data is included in the mail read page, the memo data can be displayed in the form of balloon text or pop-up window through memo data paring from the memo database on occurrence of cursor event.

According to another embodiment of the present invention, independent folder for the mail with memo data can be provided to the user so that user can check only the mail with memo data. If the user clicks memo mail folder, only the mail data with memo data by grouping is provided.

According to another embodiment of the present invention, the mail read page may display mail data on the basis of memo data unlike the case of FIG. 6 that displays mail data on the basis of mail title.

Since the accompanying drawings and the detailed description are only examples of the present invention, it is only for describing the present invention not for limiting the scope of the present invention. Therefore, those who skilled in the art will understand that many changes and equivalent embodiments can be made without departing from the present invention. Thus, the true scope of the present invention must be determined by the accompanying claims.

Industrial Applicability

As described above, according to the preferred embodiments of the present invention, user can check brief information of mail contents or attachment file of the mail without opening the mail by inserting memo that explains the mail briefly. Further, because the mail sender as well as the mail receiver can insert the memo and send mail where memo is inserted, the mail receiver can check mail contents briefly without load of server.

The invention claimed is:

1. A method for providing memo function in an electronic mail, the method comprising:
  receiving an electronic mail;
  checking if memo data inputted by a mail sender exist in the electronic mail;
  deriving the memo data from the received electronic mail to insert the memo data into an electronic mail header;
  deriving a determined number of electronic mail headers stored in a receiver mail box in response to a mail read request from a receiver mail user agent (MUA);
  generating a mail read page, the mail read page comprising the determined number of electronic mail headers and a memo icon, the memo icon indicating the received electronic mail having memo data;
  transmitting the mail read page to the receiver mail user agent (MUA); and
  displaying immediately at least a portion of the inserted memo data in response to detection of a mouse event,
  wherein the memo data does not comprise electronic mail addressing information, and
  wherein the memo data includes at least a part of content of the received electronic mail.

2. The method of claim 1, wherein the memo data is included in a multipurpose Internet mail extensions (MIME) header.

3. The method of claim 1, wherein the memo data is included in the form of attachment file.

4. The method of claim 1, wherein the electronic mail header where memo data is inserted includes a sender address, a receiver address, a mail title, and the memo data.

5. The method of claim 1, wherein the mail read page comprises an applet configured to output memo data in response to detection of the mouse event in the receiver MUA.

6. A non-transitory computer-readable recording medium to record a program for implementing the method recited in claim 1.

7. A method for providing memo function in electronic mail, the method comprising:
  receiving an electronic mail;
  checking if memo data inputted by a mail sender exist in the electronic mail;
  deriving the memo data from the electronic mail to store the memo data in a memo database;
  associating storage location information with the electronic mail;
  deriving a determined number of electronic mail headers stored in a receiver mail box in response to a mail read request from a receiver mail user agent (MUA);
  generating a mail read page, the mail read page comprising the determined number of electronic mail headers and a memo icon, the memo icon indicating the electronic mail having memo data;
  transmitting the mail read page to the receiver mail user agent (MUA); and
  displaying immediately at least a portion of the stored memo data in response to detection of a mouse event,
  wherein memo data is displayed by using storage location information in memo data parsing in response to detection of the mouse event, and
  wherein the memo data does not comprise electronic mail addressing information.

8. The method of claim 7, wherein the memo data is displayed in the form of at least one of balloon text and pop-up window.

9. The method of claim 7, wherein the mouse event comprises one of an event that a mouse cursor is located on the memo icon and a mouse double click event corresponding to the memo icon.

10. The method of claim 7, wherein the mail read page comprises an applet configured to output memo data in response to detection of the mouse event in the receiver MUA.

11. A non-transitory computer-readable recording medium to record a program for implementing the method recited in claim 7.

12. A method for providing memo function in an electronic mail, the method comprising:
  deriving a predetermined number of electronic mail headers in response to a mail read request from a receiver mail user agent (MUA);
  generating a mail read page that displays data corresponding to at least one field of the predetermined number of mail headers in the form of a list to transmit the nail read page to the receiver mail user agent (MUA);
  generating a mail contents read page that comprises a memo input button and displays mail contents in response to selection of one electronic mail in the list to transmit the mail contents read page to the receiver mail user agent (MUA); and
  associating memo data with the selected electronic mail in response to selection of the memo input button, input of the memo data, and receipt of the memo data from the receiver mail user agent (MUA),
  wherein the mail contents read page comprises an output window for outputting message contents of the electronic mail and an input window for inputting memo data, and
  wherein inputted memo data is transmitted to a mail server in response to selection of the memo input button.

13. The method of claim 12, further comprising transmitting a memo input page in response to selection of the memo input button, wherein the memo data inputted in the memo input page is transmitted to a mail server.

14. The method of claim 12, further comprising:
  deriving a predetermined number of electronic mail headers stored in a receiver mail box;
  generating a mail read page, the mail read page displaying the predetermined number of electronic mail headers in the form of a list, displaying a memo icon for the electronic mail header with memo data, and comprising an applet configured to output memo data in response to detection of a mouse event in the receiver mail user agent (MUA); and
  transmitting the mail read page to the receiver mail user agent (MUA).

15. The method of claim 12, further comprising:
  deriving electronic mails comprising memo data to group the derived electronic mails in response to a user request; and
  generating a mail read page to display a predetermined number of electronic mail headers in the form of a list, to display a memo icon for the electronic mail header with memo data, and comprising an applet configured to output memo data in response to detection of a mouse event in the receiver mail user agent (MUA).

16. The method of claim 12, further comprising generating a mail read page including an applet configured to display contents of memo data instead of a mail title in the electronic mail list.

17. A non-transitory computer-readable recording medium to record a program for implementing the method recited in claim 12.

18. The method of claim 12, wherein associating memo data with the selected electronic mail comprises inserting memo data into the selected electronic mail header in response to receipt of the memo data from the receiver mail user agent (MUA).

19. The method of claim 12, wherein associating memo data with the selected electronic mail comprises storing memo data in a memo database by associating the memo data with the selected electronic mail in response to receipt of the memo data from the receiver MUA.

20. A method for providing memo function in an electronic mail, the method comprising:

receiving an electronic mail;

checking if memo data inputted by a mail sender exist in the electronic mail;

deriving the memo data and mail header information from the received electronic mail to store the derived information in a database;

deriving electronic mail header information and memo data corresponding to a receiver in response to mail read request from a receiver mail user agent (MUA);

generating a mail read page, the mail read page displaying a determined number of electronic mail headers in the form of list, displaying a memo icon for the electronic mail header with memo data, and including an applet configured to output memo data in response to detection of a mouse event in the receiver mail user agent (MUA);

transmitting the mail read page to the receiver mail user agent (MUA), and wherein the memo data does not comprise electronic mail addressing information.

\* \* \* \* \*